US008943297B2

(12) United States Patent
Lee et al.

(10) Patent No.: US 8,943,297 B2
(45) Date of Patent: *Jan. 27, 2015

(54) PARALLEL READ FUNCTIONAL UNIT FOR MICROPROCESSORS

(71) Applicant: Teleputers, LLC, Princeton, NJ (US)

(72) Inventors: Ruby Lee, Princeton, NJ (US); Yu-Yuan Chen, Chandler, AZ (US)

(73) Assignee: Teleputers, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,379

(22) Filed: Jan. 8, 2013

(65) Prior Publication Data

US 2013/0132688 A1     May 23, 2013

Related U.S. Application Data

(63) Continuation of application No. 12/690,040, filed on Jan. 19, 2010, now Pat. No. 8,352,708.

(60) Provisional application No. 61/145,276, filed on Jan. 16, 2009.

(51) Int. Cl.
*G06F 12/00*     (2006.01)
*G06F 21/72*     (2013.01)
(Continued)

(52) U.S. Cl.
CPC ............... *G06F 12/00* (2013.01); *G06F 21/72* (2013.01); *H04L 9/0631* (2013.01); *G06F 9/30032* (2013.01); *G06F 9/30036* (2013.01);
(Continued)

(58) Field of Classification Search
CPC   G06F 3/0646; G06F 12/1009; G06F 12/1483
USPC ............... 711/205, 219; 710/36, 52, 212, 235
See application file for complete search history.

(56) References Cited

U.S. PATENT DOCUMENTS 8,352,708 B2 *    1/2013   Lee et al. ..................... 711/219
2004/0054879 A1 *   3/2004   Macy et al. .................. 712/221
(Continued)

OTHER PUBLICATIONS

Fiskiran et al., "Fast Parallel Table Lookups to Accelerate Symmetric-Key Cryptography," Proceedings of the International Conference on Information Technology Coding and Computing (ITCC), Embedded Cryptographic Systems Track, pp. 526-531, Apr. 2005 (6 pages).
Fiskiran et al., "On-Chip Lookup Tables for Fast Symmetric-Key Encryption," Proc. IEEE 16$^{th}$ Int. Conf. Application—Specific Systems, Architectures, and Processors (ASAP), pp. 356-363, Jul. 2005 (8 pages).

*Primary Examiner* — Reba I Elmore
(74) *Attorney, Agent, or Firm* — McCarter & English, LLP

(57) ABSTRACT

A functional unit is provided which allows for fast, parallel data read, write, and manipulation operations. The functional unit includes first and second source registers for receiving first and second data items to be processed by the functional unit, a plurality of memory tables, a combinational logic circuit, and a decoder. Each of the tables is indexed by an index comprising a portion of the first data item received by the first source register. The combinational logic circuit receives lookup results, and processes the lookup results and the second data item in the second source register to produce a result data item. The decoder circuit extracts an operational code from an instruction supplied to the functional unit, decodes the operational code, and controls the combinational logic circuit in accordance with the operational code.

26 Claims, 10 Drawing Sheets

(51) Int. Cl.
  *H04L 9/06* (2006.01)
  *G06F 9/30* (2006.01)
(52) U.S. Cl.
  CPC ........... *G06F9/3004* (2013.01); *H04L 2209/04* (2013.01); *H04L 2209/12* (2013.01)
  USPC .............. 711/219; 711/207; 710/36; 710/52; 710/212; 710/235

(56) References Cited

U.S. PATENT DOCUMENTS

| | | | |
|---|---|---|---|
| 2006/0039374 A1* | 2/2006 | Belz et al. | 370/389 |
| 2007/0285286 A1 | 12/2007 | Hussain et al. | |
| 2009/0037504 A1 | 2/2009 | Hussain | |

* cited by examiner

US 8,943,297 B2

PARALLEL READ FUNCTIONAL UNIT FOR MICROPROCESSORS

RELATED APPLICATIONS

This application is a continuation application of and claims the benefit of priority to U.S. patent application Ser. No. 12/690,040 filed Jan. 19, 2010, now U.S. Pat. No. 8,352,708, which claims the priority of U.S. Provisional Application Ser. No. 61/145,276 filed Jan. 16, 2009, the entire disclosures of which are expressly incorporated herein by reference.

BACKGROUND OF THE INVENTION

1. Field of the Invention

The present invention relates to improvements in microprocessors for computer systems. More specifically, the present invention relates to a parallel read functional unit for microprocessors, and methods relating thereto.

2. Related Art

An important consideration in the design of today's modern computer systems is the need to protect data. Efforts in this regard focus both on hardware and software solutions. Symmetric-key cryptography is one solution that can be used to provide data confidentiality on public communication networks such as the Internet. It involves encrypting a plaintext message P using a symmetric-key algorithm (cipher) and a secret key K. The encrypted message (ciphertext) is then sent to the receiver, where it is decrypted using the same cipher and secret key. Symmetric-key ciphers usually have an iterated round structure, where a short sequence of operations (called a round) is repeated on the plaintext block to compute the ciphertext. The input of a round consists of the output of the previous round and one or more subkeys, which are derived from the secret key. Common round operations include table lookups, modular addition (subtraction), logical operations, shifts, rotates, multiplications, and bit permutations.

On a programmable processor that implements a reduced instruction-set computer (RISC)-like instruction set, table lookups generally consume the greatest fraction of the execution time. Table 1, below, lists some sample symmetric-key ciphers and their associated rounds and table lookup characteristics. For each cipher, shown in Table 1 is the block size, typical key size, and the number of rounds.

TABLE 1

| Cipher | Block Size (bits) | Key Size (bits) | Num. Rounds | Num. Tables | Table Structure | Num. Lookups |
|---|---|---|---|---|---|---|
| DES | 64 | 56 | 16 | 8 | $2^6 \times 32$ | 128 |
| 3DES | 64 | 112 | 48 | 8 | $2^6 \times 32$ | 384 |
| RC4 | 8 | 128 | 1* | 1 | $2^8 \times 8$ | 3 + 2W |
| Blowfish | 64 | 128 | 16 | 4 | $2^8 \times 32$ | 64 |
| AES-128 | 128 | 128 | 10 | 4 | $2^8 \times 32$ | 160 |
| AES-192 | 128 | 192 | 12 | 4 | $2^8 \times 32$ | 192 |
| AES-256 | 128 | 256 | 14 | 4 | $2^8 \times 32$ | 224 |
| Twofish | 128 | 128 | 16 | 4 | $2^8 \times 32$ | 128 |
| MARS | 128 | 128 | 32 | 2 | $2^8 \times 32$ | 80 |

As used above, block size represents the amount of data that the cipher can encrypt at a time, and key size relates to the strength of the cipher against cryptanalytic attacks. Data Encryption Standard (DES) and its variant 3DES were the NIST standards for block encryption from 1976 to 2001. 3DES continues to be used extensively in many systems. RC4 is a popular stream cipher, which is originally used in the IEEE 802.11 wireless standard. Blowfish is used in many protocols and applications, for example GPG, SSH, SSLeay, and JAVA cryptography extensions. Advanced Encryption Standard (AES) is the current NIST standard for block encryption. Its key size can be 128, 192, or 256 bits. These are denoted above as AES-128, AES-192, and AES-256, respectively. Twofish and MARS are two of the five finalist ciphers in the AES selection program.

FIG. 1 illustrates how table lookups are typically used in existing symmetric-key ciphers. With reference to both FIG. 1 and Table 1 above, summarized are the number and structure of the lookup tables used by each cipher. The notation $2^a \times b$ is used to denote a table with $2^a$ entries, where each entry is b-bits wide. In AES, the input to the ith round is a 128-bit block composed of four 32-bit words. The bytes in these words are labeled b0 to b15. There are four $2^8 \times 32$ tables, labeled TA-TD. The rightmost byte of each word is used as index into TA, the next byte is used as index into TB, and so on, until all tables are accessed four times. The table lookup results and four subkeys are then exclusive-or'ed (XORed) as shown. Of the remaining ciphers, Blowfish, MARS, and Twofish are similar to AES in that they use multiple $2^8 \times 32$ tables. DES and 3DES use eight $2^6 \times 32$ tables, while RC4 uses a single $2^8 \times 8$ table.

In the past, special instructions for accelerating table lookups in symmetric-key ciphers have been provided for microprocessors. The sbox instruction performs fast lookups of tables located in main memory by accelerating the effective address computations. The CryptoManiac processor uses a similar sbox instruction to read its four 1 kB on-chip caches. However, in both of these approaches, only a single table can be read with each sbox instruction. Other approaches, such as the PAX crypto-processor, provide on-chip lookup tables can be used to accelerate symmetric-key encryption. However, the number of tables and table widths are not scalable, and must utilize multiple sub-opcode fields to specify the number of lookups to be performed, data size, and the index bytes to be used. Still further, existing approaches contain complex logic circuits which result in increased circuit area and reduced speed.

SUMMARY OF THE INVENTION

The present invention relates to a functional unit for a microprocessor, which allows for fast, parallel data read, write, and manipulation operations in the microprocessor that are useful for a number of software applications, such as cryptography. The functional unit includes first and second source registers for receiving first and second data items to be processed by the functional unit; a first bank of memory tables in connected in parallel to the first source register, each of the first bank of memory tables indexed by a first index comprising a first portion of the first data item received by the first source register, the index pointing to a first lookup result in a respective one of the first bank of memory tables; a second bank of memory tables in connected in parallel to the first source register, each of the second bank of memory tables indexed by a second index comprising a second portion of the first data item received by the first source register, the index pointing to a second lookup result in a respective one of the second bank of memory tables; a combinational logic circuit in communication with the first and second banks and the second source register, the combinational logic circuit receiving the lookup results from the first and second banks and processing the lookup results and the second data item in the second source register to produce a result data item; and a decoder circuit in communication with the combinational logic circuit, the decoder circuit extracting an operational code from an instruction supplied to the functional unit, decoding the operational code, and controlling the combinational logic circuit in accordance with the operational code.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a parallel read functional unit for microprocessors, as discussed in detail below in connection with FIGS. 2-8.

Figure 2:
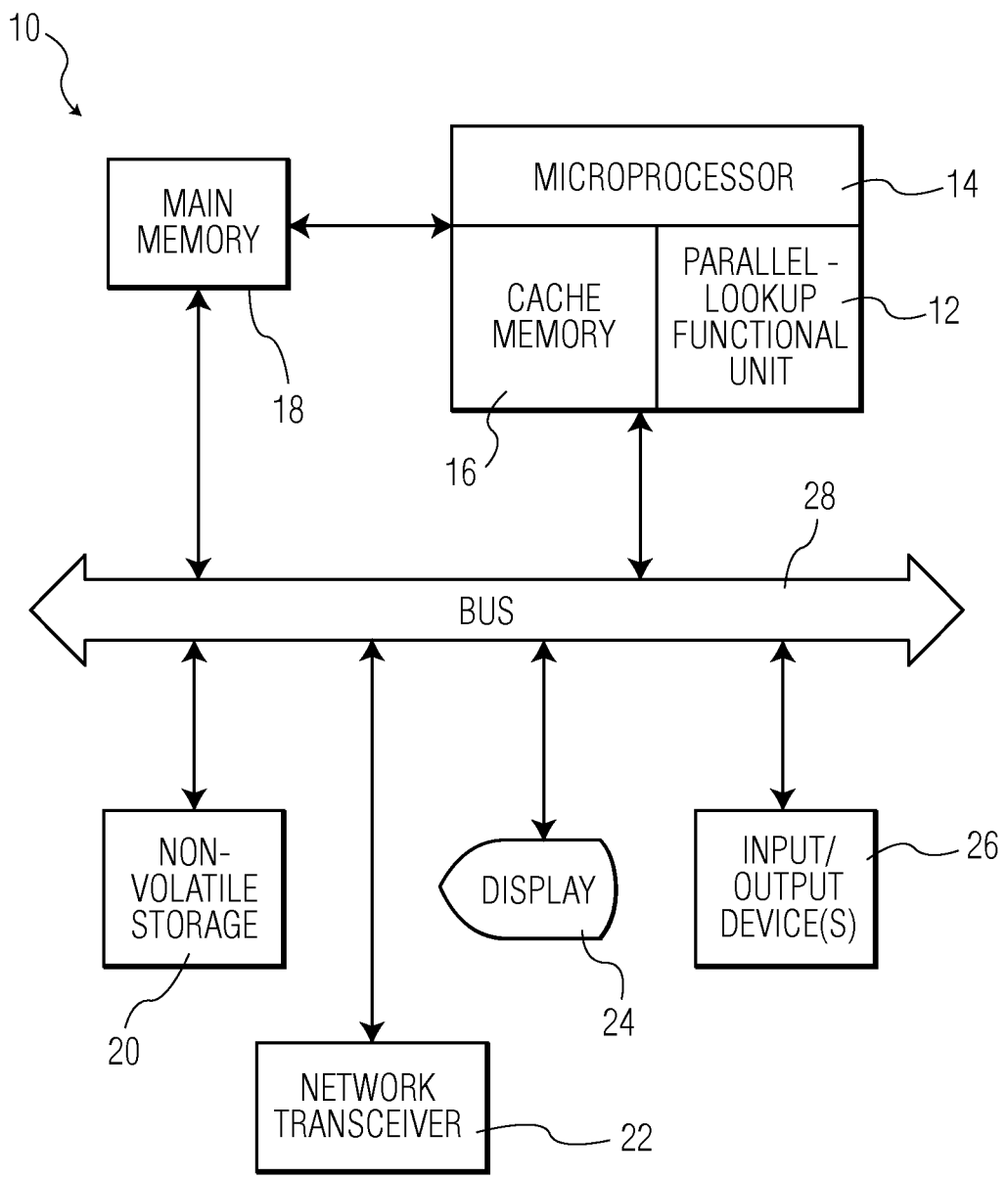
FIG. 2 is a block diagram showing a computer system in which the parallel-lookup functional unit of the present invention can be implemented.

FIG. 2 is a block diagram showing a computer system 10 in which the parallel-lookup functional unit 12 of the present invention can be implemented. The computer system 10 could be any type of computer system, such as a desktop personal computer, a handheld computer (e.g., personal digital assistant, tablet computer, pocket computer, etc.), a smart cellular telephone, an embedded computer system, a system-on-chip (SOC) device, a server, a blade computer, or any other type of computer system. Preferably, the functional unit 12 is implemented within a microprocessor 14 of the computer system 10. The microprocessor 14 could support any desired architecture, such as the Intel x86, Sun SPARC, IBM Power, or any other desired architecture, and could have one or more processing cores. The microprocessor 14 includes a cache memory 16, which could include on-chip level 1 (L1) and level 2 (L2) cache memories.

A main memory 18 is also provided in the computer system 10, and could be any suitable type of random-access or persistent main memory, such as dynamic random-access memory (DRAM) or any other type of memory. Also, the computer system 10 includes a non-volatile storage 20, which could include disk (e.g., hard disk), flash memory, read-only memory (ROM), erasable, programmable ROM (EPROM), electrically-erasable, programmable ROM (EEPROM), or any other type of non-volatile memory. A network transceiver 22 could also be provided, such as an Ethernet transceiver, modem, etc., to allow for network/Internet communications, as well as a display 24 and one or more input/output device(s) 26 (e.g., keyboard, touchscreen, mouse, etc.). A bus 28 permits communication between the various components shown in FIG. 2. As will be discussed in greater detail below, the functional unit 12 allows for fast, on-chip security features including fast encryption and decryption of data processed by the microprocessor 14.

Figure 3:
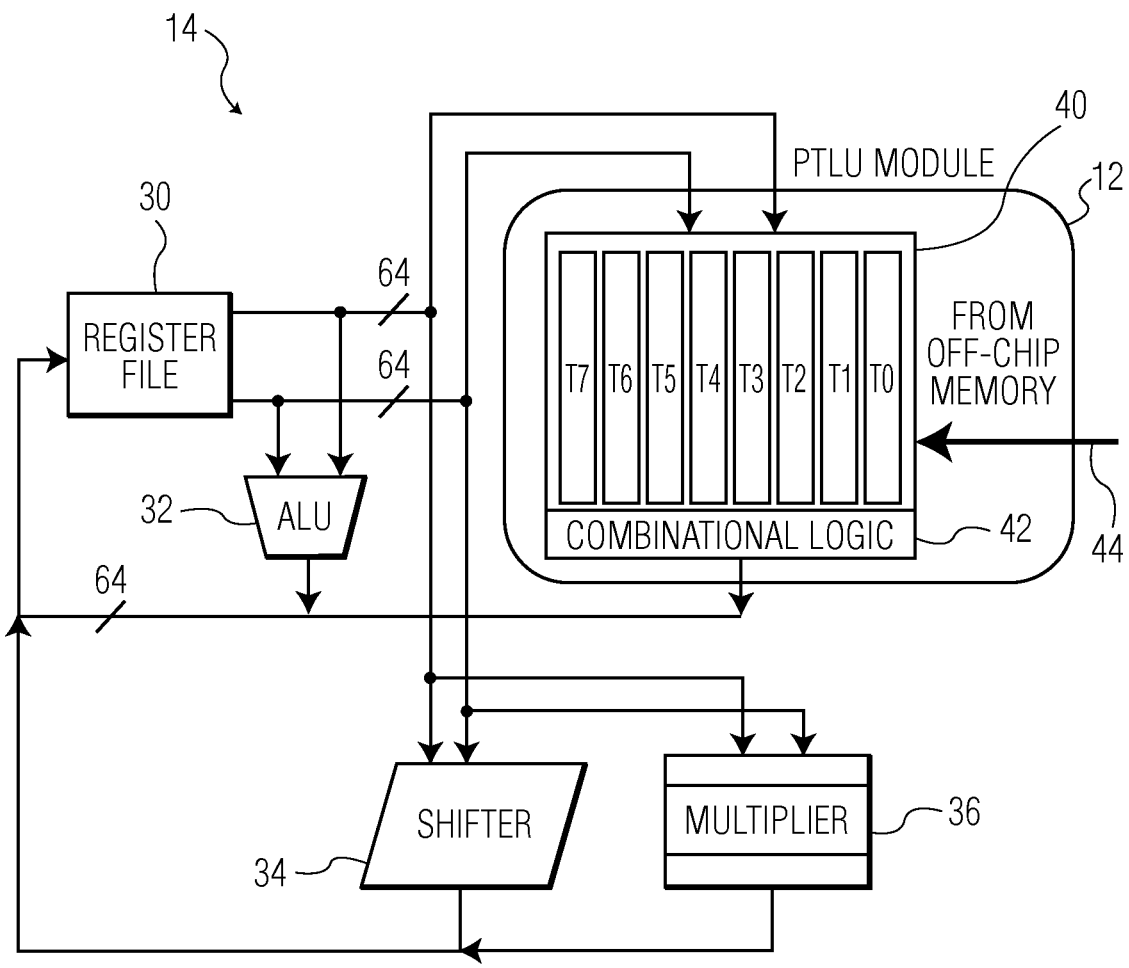
FIG. 3 is block diagram showing the functional unit and the microprocessor of FIG. 2 in greater detail.

FIG. 3 is block diagram showing the functional unit 12 and the microprocessor 14 of FIG. 2 in greater detail. As with conventional microprocessors, the microprocessor 14 includes a register file 30, an arithmetic-logic unit 32, a shifter 34, and a multiplier unit 36. The functional unit 12 (also referred to herein as a parallel table lookup unit (PTLU) module) can be thought of as an additional, high-speed "scratchpad" memory for the microprocessor 14, so as to facilitate fast, on-chip encryption and decryption of data, as well as for facilitating fast, on-chip execution of processes by the microprocessor 14. The functional unit 12 includes a plurality of memory tables 40 (eight tables labeled T0-T7 are shown, but any desired number could be provided) and combinational logic circuits 42. The memory tables 40 receive off-chip data 44 from a memory external to the microprocessor 14, such as the memories 18 and 20 shown in FIG. 2 or any other desired data source external to the microprocessor 14.

Figure 4:
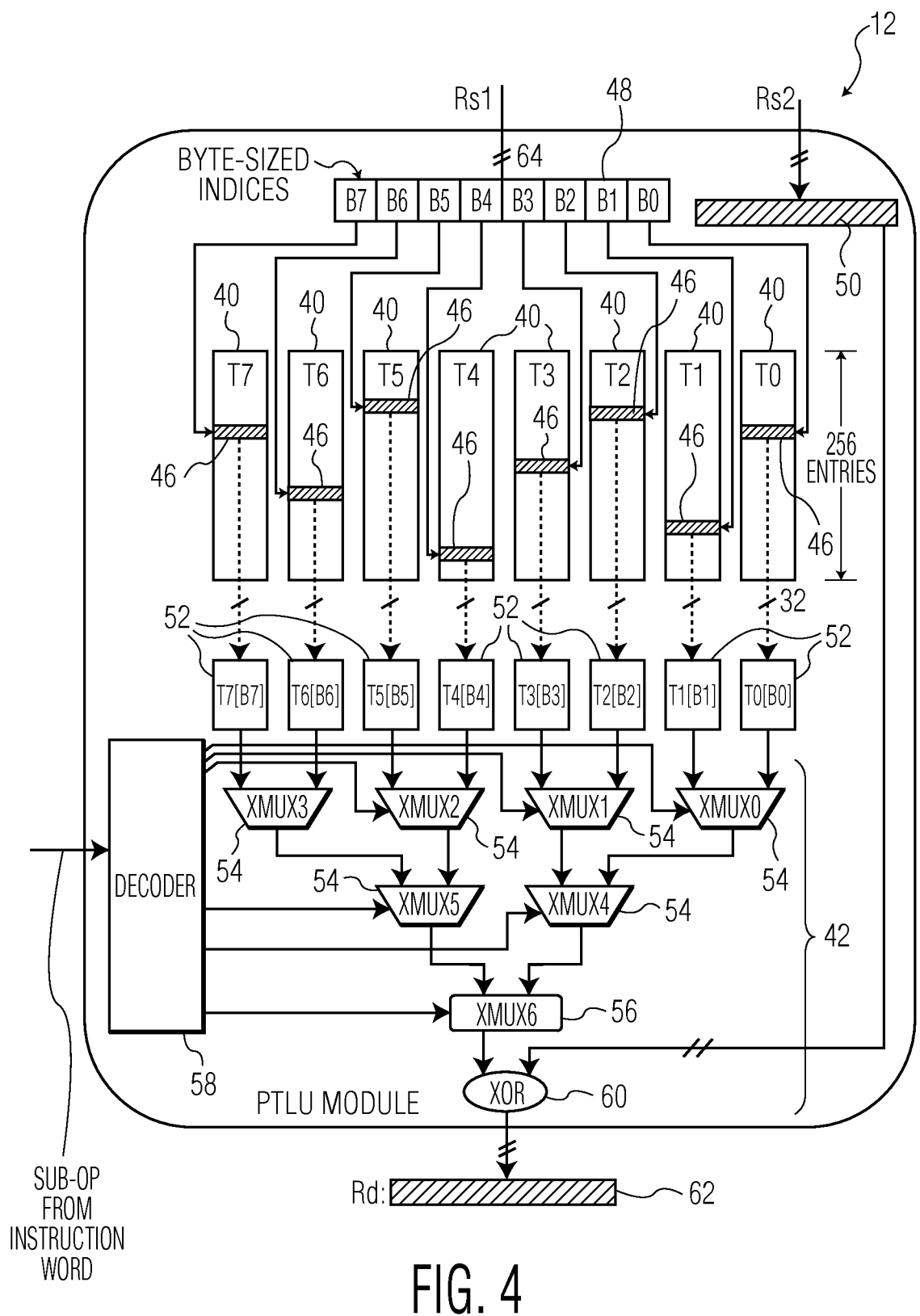
FIGS. 4-5B are block diagrams showing the functional unit of FIGS. 2-3 in greater detail.

FIG. 4 is a block diagram showing the functional unit 12 of FIGS. 2-3 in greater detail. The functional unit 12 receives as input two source registers Rs1 and Rs2 (labeled as elements 48 and 50 in FIG. 4), each of which could be of any desired length (e.g., 64 bits in length), and provides an output register Rd (labeled as element 62 in FIG. 4). To write to the register file 30 of FIG. 3, the functional unit 12 can use either a result bus or a cache memory bus. The tables 40 each have 256 entries, where each entry is 32 bits wide. In co-designed embedded systems, the number and/or the width of the tables 40 can be scaled down to limit cost and power. During a read operation, each table 40 is accessed by an 8-bit (byte-sized) index read from the first source register Rs1. Each index points to a specific entry 46 in the table 40. The rightmost byte of Rs1 (labeled B0) accesses entry T0, the next byte (B1) accesses entry T1, and so on. All eight tables 40 can be read in parallel. The eight 32-bit lookup results 52 (one from each table 40) are then routed through the combinational logic circuits 42, which include seven XOR multiplexers 54 and 56 (labeled XMUX0 to XMUX6) and an XOR unit 60. The XOR unit 60 simply XORs the output of XMUX6 with Rs2. The signals that control the XMUXs 54 and 56 come from a decoder 58, which, in turn, is controlled by a sub-opcode from an instruction word provided to the functional unit 12.

Figure 5A:
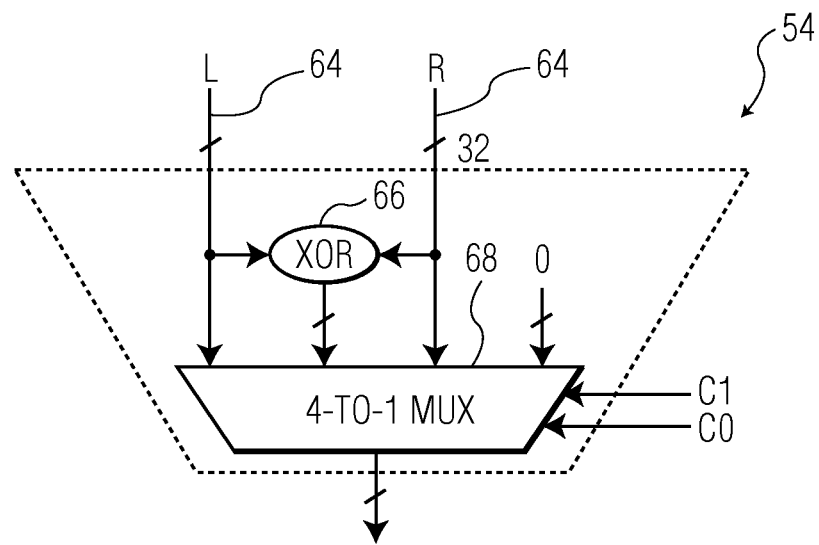
Figure 5B:
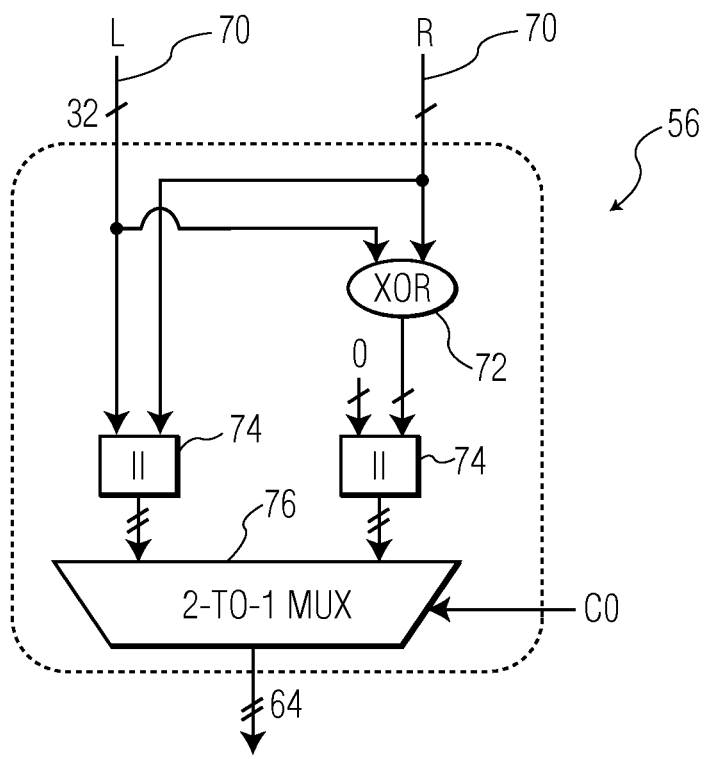

FIGS. 5A-5B are diagrams showing the XMUXs 54 and 56 of FIG. 4 in greater detail. As shown in FIG. 5A, each XMUX 54 has two 32-bit inputs 64 labeled L and R, for left and right, an XOR circuit 66, and a 4-to-1 multiplexer 68. Based on the values of two control bits (C1, C0), the XMUX 54 output can be: 0, L, R, or L XOR R. This is summarized in Table 2, below. XMUX 56 is shown in FIG. 5B, and includes two 32-bit inputs 70 (labeled L and R), an XOR circuit 72, two bit concatenation circuits 74, and a 2-to-1 multiplexer 76. The output of the XMUX 56 is either L XOR R, or, L‖R, where ‖ denotes concatenation of the inputs 70.

TABLE 2

|  | (C1, C0) Value | | | |
| --- | --- | --- | --- | --- |
|  | (1, 1) | (1, 0) | (0, 1) | (0, 0) |
| XMUXs 0 to 5 | L ⊕ R | 0 | L | R |
| XMUX6 | L ⊕ R | L ‖ R | N/A | N/A |

A plurality of instructions for using the functional unit 12 of the present invention are presented herein. Such instructions can be added to a base instruction set such as the one shown below in Table 3, and are shown in the row labeled "New ISA."

TABLE 3

| Class | Instructions |
| --- | --- |
| Base ISA ALU | add, addi, sub, subi, and, andi, or, ori, xor, xori, not, loadi |
| Shift | sra, srai, srl, srli, sll, slli, shrp (shift right pair) |
| Multiply | mul.lo, mul.hi |
| Memory | load, store (base + displacement addressing) |
| Branch | beq, bne, bg, bge, call, return, trap |
| New ISA | ptrd.x, ptrd.s, ptw1, ptwn, byte_perm |

The new instructions of the present invention can be grouped into read instructions, write instructions, and byte manipulation instructions. The read instructions are now described.

Three read instructions in accordance with the present invention are provided. The first read instruction has the following format:

ptrd.x1 Rd, Rs1, Rs2 where Rd is the destination register; Rs1 is the first source register shown in FIG. 3 (which supplies the byte-sized table indices), and Rs2 is the second source register shown in FIG. 3 (which is routed to the right input of the XOR unit 60 of FIG. 3). The symbol 'x1' in the mnemonic indicates that this instruction XORs all 8 lookup results and Rs2 into a single value. This is achieved by setting all XMUX control bits to 1.

The second read instruction in accordance with the present invention has the following format:

ptrd.x2 Rd, Rs1, Rs2 where the table lookup results and Rs2 are XORed into to two parallel values. This is achieved by setting all XMUX control bits to 1 except for XMUX6, which has its C0 bit set to zero. Hence, the output of XMUX6 becomes the concatenation of the outputs of XMUX5 and XMUX4.

To select and write a table lookup result to Rd without an XOR, a third read instruction ptrd.s (s signifies select) in accordance with the present invention is defined in the following format:

ptrd.s.tab Rd, Rs1, Rs2 where tab is a 2-bit sub-opcode field that selects one of the tables T0-T3 to write to the rightmost 32 bits of Rd. Simultaneously, a second table is selected from T4-T7 to write to the leftmost 32 bits of Rd. For example, if tab=2, then the output of T2 and T6 are written to the rightmost and leftmost 32 bits of Rd respectively, thereby implementing two parallel table lookups.

The write instructions in accordance with the present invention are now described. Two write instructions are provided. The first write instruction has the following format:

ptw1.table Rs1, Rs2 where '1' in the instruction signifies that a single PTLU table is written, which is selected by the 3-bit sub-opcode field table. The rightmost byte of Rs1 is used as the table index and the selected table entry is written with the rightmost 32 bits of Rs2. Ptw1 can only write one table at a time, but this does not degrade encryption performance since ciphers do not require parallel table writes.

However, fast parallel writes may be desired for rapid initialization of tables at setup time. For this, a second write instruction ptwn is provided (n signifies that multiple tables are written in parallel). Ptwn uses the wide memory bus shown on the right in FIG. 3 and has the following format:

ptwn Rs, Rb, disp where Rb is a base address register and disp is the displacement. The 32-byte memory block from address Rb+disp is written to a common row of all eight PTLU tables in parallel. The row is selected by the rightmost byte of Rs. All PTLU entries can be written using 256 ptwn instructions.

The byte manipulation instructions in accordance with the present invention are now described. In the ptrd instruction discussed above, the source bytes in Rs1 access the PTLU tables in a fixed order. To allow lookups where the source bytes need to access tables T0-T7 in random order, a byte_perm (byte permutation) instruction is provided as follows:

byte_perm Rd, Rs, Rc

This instruction can perform any permutation of the bytes in Rs based on the control bits in Rc. By complementing PTLU with byte_Perm, a much wider variety of parallel lookups can be realized.

Figure 6A:
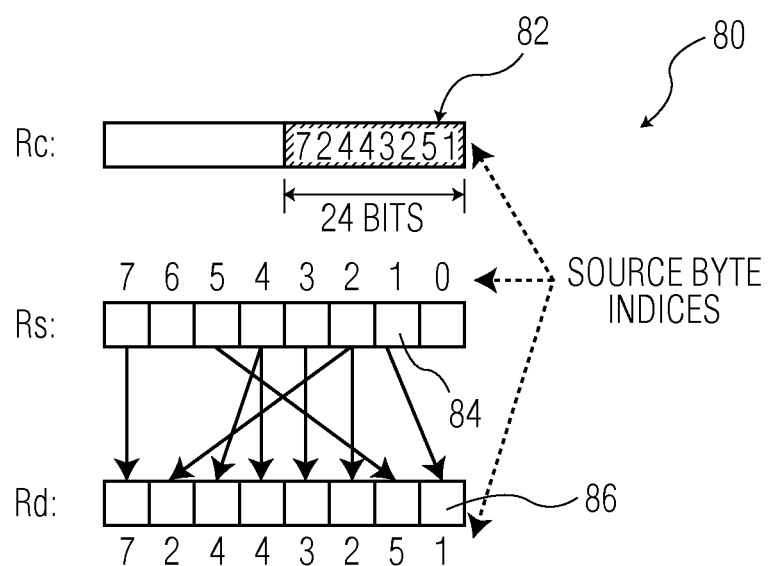
FIGS. 6A-6B are diagrams showing operation of the byte permute instruction of the present invention and a shift instruction.

An example of the byte_perm instruction, indicated generally at 80, is shown in FIG. 6A. The rightmost 3 bits in Rc (labeled as 82) choose the source byte (shown at 84) to be written to the rightmost byte of Rd (B0; shown at 86). The next 3 bits choose the byte to be written to B1, and so on. The leftmost 40 bits of Rc are unused. This is like the permute instruction in the known MAX-2 instruction set architecture and the known pperm instruction, but is restricted to bytes.

Figure 6A:
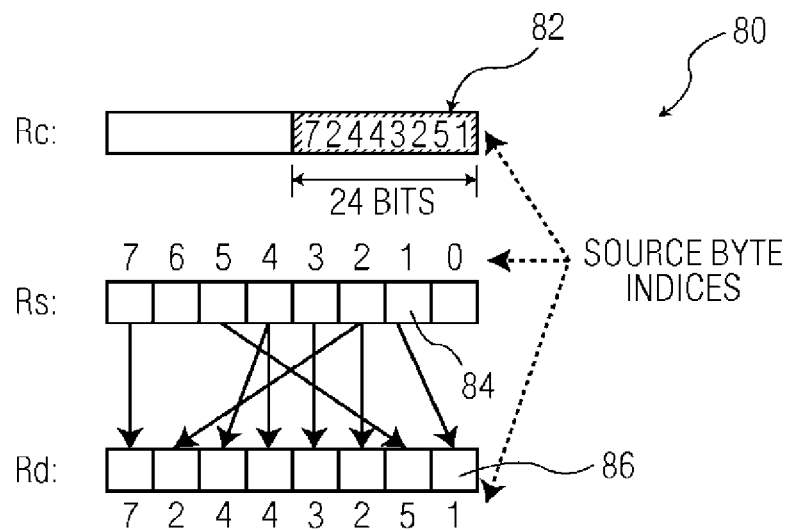
Figure 6B:
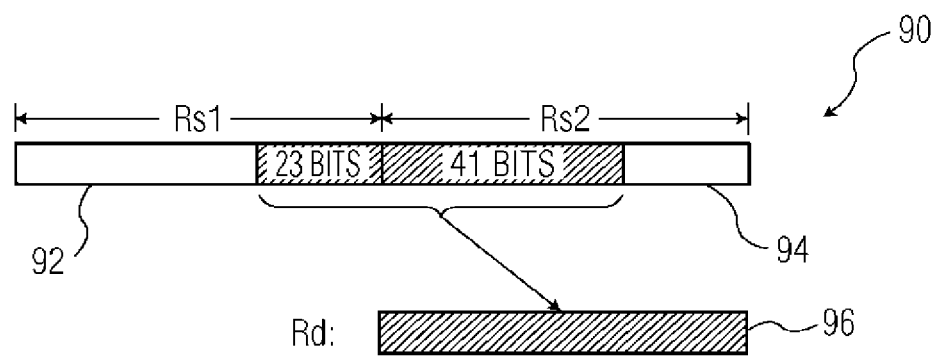

The byte_perm instruction can be implemented in hardware using eight 8-to-1 multiplexers (each 8-bit-wide). As discussed herein, byte_perm is implemented by extending the shifter, which is referred to as the Shift-Permute Unit (SPU). To permute more than eight bytes efficiently, byte_perm can be used together with the shift right pair (shrp) instruction, as shown in FIG. 6B and indicated generally at 90. As can be seen, the shift instruction permits any two desired portions of the source registers Rs1 and Rs2 (labeled by elements 92 and 94, respectively) to be shifted to desired locations in the destination register Rd (labeled by element 96).

The parallel read functional unit of the present invention has been tested in various simulations. To evaluate the cost of new hardware, baseline results were first established by designing in VHDL the functional units of the processor shown in FIG. 3, which implements the Base ISA in Table 3. Subsequently extended into the simulated processor were the new instructions of the present invention, as discussed above. For area and delay estimates, gate-level synthesis of the functional units was performed using Synopsys tools with TSMC 90 nm technology library. For the PTLU module, CACTI 3.2 was used, which is a tool for estimating the access time, area, and aspect ratio of memory components. Table 4, below summarizes the simulation results.

TABLE 4

| Functional Unit/Component | Area | | | Delay | | Cycles |
|---|---|---|---|---|---|---|
| | $\mu^2$ | NAND Gate Equivalent | Normalized (ALU = 1.00) | ns | Normalized (ALU = 1.00) | |
| ALU | 19122 | 7904 | 1.00 | 0.55 | 1.00 | 1 |
| Shifter | 6660 | 2753 | 0.35 | 0.45 | 0.82 | 1 |
| SPU with byte_perm | 7432 | 3512 | 0.44 | 0.55 | 1.00 | 1 |
| PTLU: 8 Tables | 322464 | 133296 | 16.86 | 0.37 | 0.67 | 1 |
| PTLU: XMUX Tree | 33972 | 14043 | 1.78 | 0.18 | 0.33 | 1 |
| PTLU: Total | 356436 | 147336 | 18.64 | 0.55 | 1.00 | 1 |
| 32 kB 2-way cache w/ 64-byte blocks | 1012722 | 418619 | 52.96 | 0.63 | 1.15 | 2 |
| 256 kB 2-way cache w/ 64-byte blocks | 6913820 | 2857895 | 361.58 | 0.88 | 1.60 | 2 |

For each functional unit, absolute area is represented in square microns, the equivalent number of minimum-sized two-input NAND gates, and relative area normalized to the ALU. Delay is given as absolute delay in nanoseconds, relative delay with respect to ALU, and number of clock cycles assuming that ALU latency is a single cycle. It was verified that implementing byte_perm in the modified shifter does not impact cycle time or increase the shifter latency in terms of clock cycles. The access time of the PTLU tables is 67% of the ALU delay. The XMUX tree could be synthesized so that the total delay through the PTLU module is no greater than the ALU delay. As such, the ptrd and ptw instructions have single cycle latency. Of the total area of the PTLU module, 90.5% is consumed by the eight lookup tables and 9.5% is consumed by the XMUXs. In today's high-end embedded processors, for example Intel PXA270, the size of the on-chip data cache is typically about 32 kB. The PXA270 also includes an additional 256 kB SRAM to be used as scratchpad memory. Compared to these, the size of the PTLU module is small (see Table 4)—about 35% of the 32 kB cache and 5% of the 256 kB cache.

Figure 7:
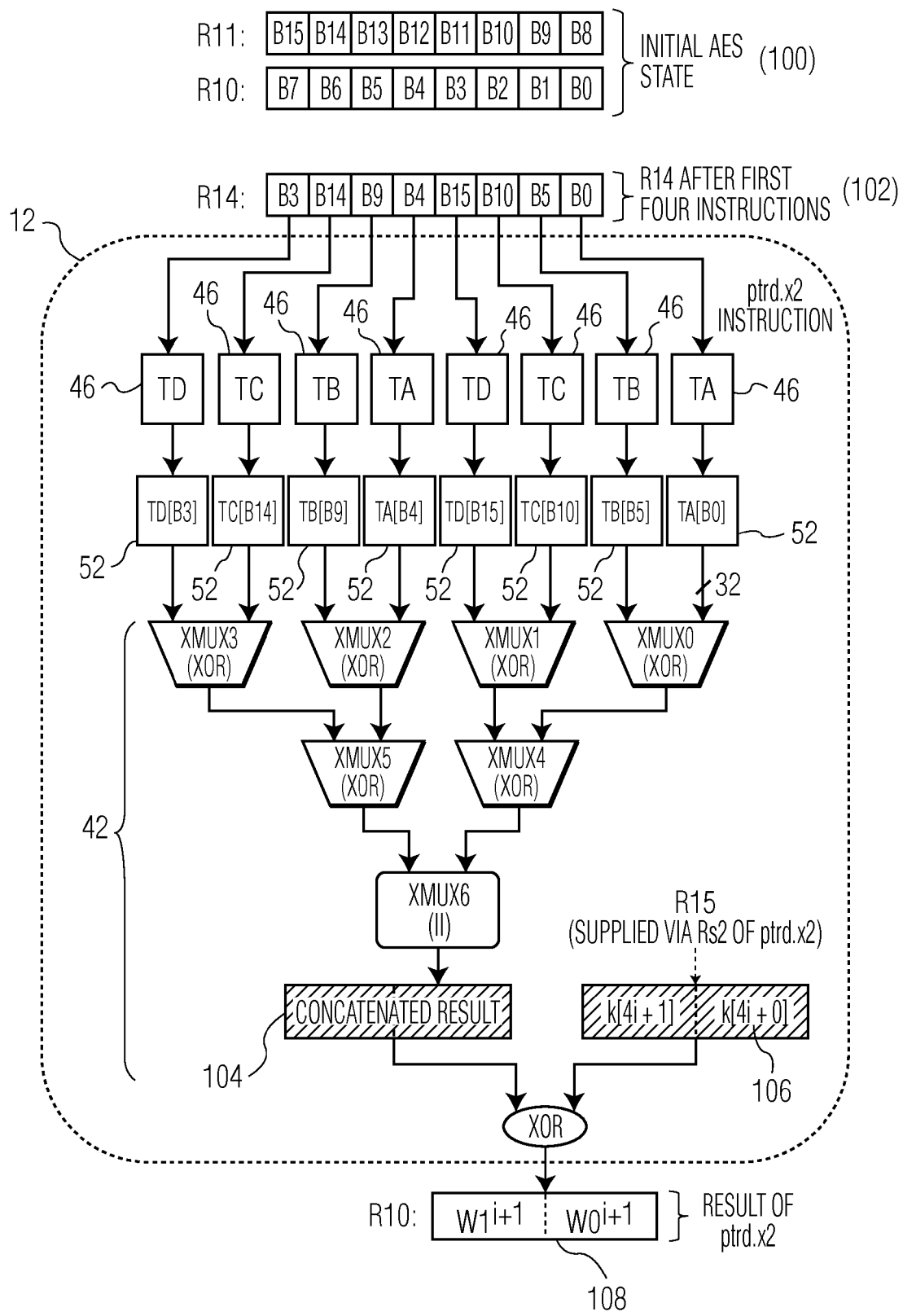
FIG. 7 is a diagram showing data flow during an AES encryption procedure executed using the functional unit of the present invention.

To illustrate the use of PTLU and byte_perm instructions, Table 5 below shows the optimized assembly code for AES on a 64-bit processor, and FIG. 7 shows the data flow in the first half of the code.

are XORed in pairs by XMUX0-XMUX5. Next, XMUX6 concatenates the output of XMUX5 and XMUX4 to produce a concatenated result 104. The result is then XORed with the subkeys 106 in R15. Destination register R10 (labeled 108) then contains $(W1^{i+1}, W0^{i+1})$. The last four instructions similarly compute $(W3^{i+1}, W2^{i+1})$. The entire AES round takes only 10 instructions.

Table 6, below, summarizes the performance improvement for all ciphers executed on a simulated 64-bit single-issue processor having the PTLU of the present invention.

TABLE 6

| Cipher | Block size (bits) | Cycles with Base ISA | Speedup with PTLU |
|---|---|---|---|
| DES | 64 | 1147 | 5.41 x |
| 3DES | 64 | 3384 | 5.32 |
| RC4 | 8 | 18 | 2.00 |
| Blowfish | 64 | 408 | 1.66 |
| AES-128 | 128 | 870 | 6.91 |
| AES-192 | 128 | 1056 | 7.23 |
| AES-256 | 128 | 1272 | 7.66 |
| Twofish | 128 | 1753 | 2.81 |
| MARS | 128 | 1677 | 1.23 |

TABLE 5

```
# R11 contains bytes 15-8 of AES state, R10 contains bytes 7-0 of AES state
byte_perm    R12, R10, R1    # Config. reg. R1 contains byte indices (7,6,2,1,5,4,3,0)
                             # R12 receives bytes (7,6,2,1,5,4,3,0) of AES state
byte_perm    R13, R11, R1    # R13 receives bytes (15,14,10,9,13,12,11,8) of AES state
shrp         R14, R12, R13, 32  # R14 receives bytes (5,4,3,0,15,14,10,9) of AES state
byte_perm    R14, R14, R2    # Config. reg. R2 contains byte indices (5,2,0,6,3,1,7,4)
                             # R14 receives bytes (3,14,9,4,15,10,5,0) of AES state
load.8       R15, R9, 0      # Load 2 subkeys; R9 is base address of subkey array
ptrd.x2      R10, R14, R15   # Lookup 8 tables, XOR results and round subkey;
                             # PTLU tables (T3-T0) and (T7-T4) contain AES tables (TD-TA)
# Now repeat for the remaining 8 lookups
shrp         R14, R13, R12, 32  # R14 receives bytes (13,12,11,8,7,6,2,1) of AES state
byte_perm    R14, R14, R2    # R14 receives bytes (11,6,1,12,7,2,13,8) of AES state
load.8       R15, R9, 8      # Load next two subkeys
ptrd.x2      R11, R14, R15   # R11, R10 contain the new AES state
```

Figure 1:
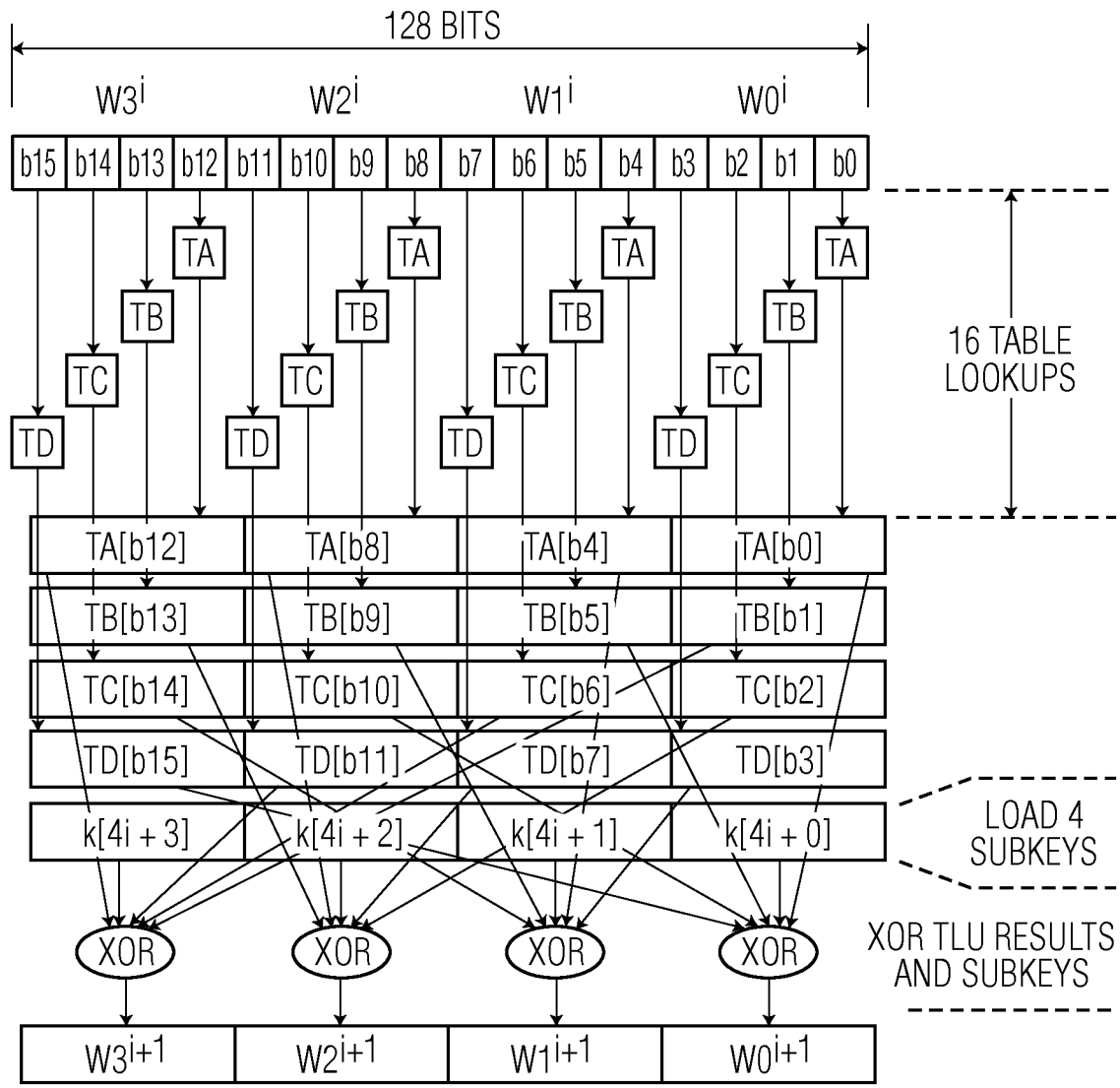
FIG. 1 is a diagram showing prior art table lookups performed by existing symmetric-key ciphers.

The initial 128-bit AES state (shown in FIG. 1) is supplied in two 64-bit registers (R11, R10) in FIG. 7, labeled 100. The PTLU tables 52 are initialized to two sets of the four AES tables. The first four byte_perm and shrp instructions permute (R11, R10) such that R14 (indicated at 102) contains eight indices 46 into tables 52 whose results can be directly XORed by the combinational circuitry 42. These are the bytes (3,14,9,4) and (15,10,5,0) in FIG. 1. The load.8 instruction loads the first two round subkeys 106 into R15. The ptrd.x2 instruction performs eight lookups using the bytes in R14. These results The improvements (speedups) are relative to the execution cycles per block of encryption with the Base ISA in Table 3. While all ciphers benefit from the new instructions, some show very large performance gains. The speedups for DES, 3DES, and AES range from 5.3 to 7.7 times. The remaining ciphers have speedups varying from 1.2 times for MARS to 2.8 times for Twofish.

Table 7, below, shows the speedups for 3DES and AES-128 achieved by the present invention and obtained with super-scalar execution on processors with issue widths from 1 to 8:

TABLE 7

| Cipher | Speedup w/ Superscalar Execution (Base ISA) | | | | | | | Speedup w/ PTLU | | |
|---|---|---|---|---|---|---|---|---|---|---|
| | 1/1 | 2/1 | 2/2 | 4/1 | 4/2 | 8/1 | 8/2 | 32-bit | 64-bit | 128-bit |
| 3DES | 1.00 | 1.62 | 1.85 | 1.78 | 2.32 | 1.88 | 2.73 | 3.41 | 5.32 | 5.32 |
| AES-128 | 1.00 | 1.58 | 1.71 | 1.85 | 2.23 | 2.02 | 2.49 | 2.79 | 6.91 | 27.19 |

The speedups are relative to a single-issue 32-bit processor that implements the 32-bit version of the Base ISA in Table 3 above. In the notation a/b, a is the issue width and b is the number of memory ports. Superscalar execution provides significant speedups for both ciphers—up to 1.9 times for 2-way and 2.3 times for 4-way. Further increasing the issue width to 8 provides a lesser degree of additional performance (up to 2.7 times).

The last 3 columns of Table 7 show the speedups when the PTLU of the present invention is added to single-issue 32-bit, 64-bit, and 128-bit processors. On the 32-bit processor, the PTLU is implemented with four $2^8 \times 32$ tables, so it can be compared to a scratchpad memory with four read ports. Similarly, the PTLU on the 128-bit processor uses 16 $2^8 \times 32$ tables, and functions like a memory with 16 read ports. The XMUX tree is scaled accordingly. While comparing single-issue processors with and without the PTLU of the present invention, it is assumed that the 64-bit and 128-bit processors support subword parallelism, which involves partitioning the datapath into units smaller than a word, called subwords. Multiple subwords packed in a word can be processed in parallel using subword parallel instructions. For example, four pairs of 32-bit subwords packed in two source registers can be added with a single parallel add (padd) instruction on the 128-bit processor. We assume that parallel versions of all ALU and shift instructions in Table 3 are supported for 32-bit subwords. On a single-issue 32-bit processor, the PTLU of the present invention provides 3.4 and 2.8 times speedup for 3DES and AES, respectively. Both figures are better than the speedups obtained on an 8-way superscalar processor without the PTLU of the present invention. On the 64-bit processor, PTLU speedup increases to 6.9 times for AES. This should be compared to the 1.7 times speedup of the 2-way 32-bit processor since both have equivalent degrees of operand parallelism. Similarly, the 27.2 times speedup on the single-issue 128-bit processor can be compared to the 2.2 times speedup of the 4-way 32-bit processor. These results indicate that using the PTLU of the present invention with wider processors is far more effective for improving performance than increasing the issue width in superscalar processors. Further, compared to a multi-issue processor, a wider single issue processor offers savings in register ports, data buses, bypass paths, and instruction issue logic.

In Table 8 below, the AES-128 performance of the present invention is compared to several programmable processors:

TABLE 8

| Platform | Cycles |
|---|---|
| ARM9TDMI | 1764 |
| Pentium III | 381 |
| IA-64 | 190 |
| HP PA-8200 | 280 |
| CryptoManiac | 90 |
| AES ASIC | 10 |
| 32-bit PTLU | 315 |

TABLE 8-continued

| Platform | Cycles |
|---|---|
| 64-bit PTLU | 126 |
| 128-bit PTLU | 32 |

As can be seen, compared to the popular ARMS embedded processors, a 32-bit baseline processor with the PTLU of the present invention (PTLU-32) provides 5.6 times better performance. A single-issue PTLU-64 easily outperforms more complicated multiway processors like Pentium III, IA-64, and PA-8200. A single-issue PTLU-128 provides 2.8 times better performance than CryptoManiac, which is 4-way VLIW (Very Long Instruction Word). The 32-cycle latency of PTLU-128 is only 22 cycles more than a hardwired AES chip.

It is noted that the width of each table entry utilized by the present invention can be determined by the specific algorithm which is utilizing the parallel read functional unit. For example, size ranges from 1 byte per entry to 16 bytes for the 128-bit registers in multimedia units is possible. It is assumed that the hardware implements a size of 4 bytes per entry. Thus, in each parallel read instruction, up to 16 different 4-byte entries can be read, from 8 parallel tables.

Figure 8:
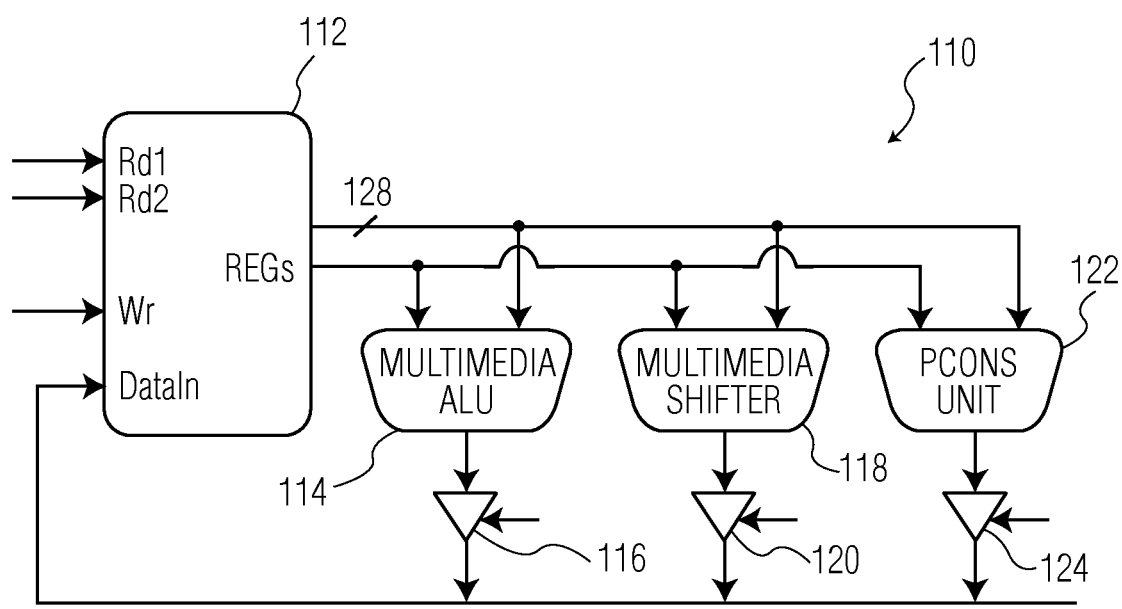
FIG. 8 is a diagram showing the functional unit of the present invention implemented in a microprocessor that supports multimedia instructions.

The parallel read and byte permutation instructions of the present invention can be implemented in a microprocessor as a "Pcons" functional unit. Such a unit is shown in FIG. 8, wherein the Pcons functional unit 122 is implemented in a microprocessor 110 having registers 112, a multimedia ALU 114, a multimedia shifter 118, and a plurality of buffers 116, 120, and 124. The Pcons unit 122 includes the circuitry and functionality discussed above, e.g., a plurality of on-chip parallel lookup tables and associated combinational and control circuitry. Since it is desirable for the Pcons unit to look more like a functional unit than memory, it is desirable to be able to utilize the processor's multimedia datapaths to and from functional units. This implies that each instruction has two register operands (three for Altivec) and one register result, each register being 128 bits. Since the Pread instruction reads 16 pieces of data each 4 bytes long, it is necessary to condense the 64 bytes of data into a register width of 128 bits (16 bytes). This is done by the combinational logic block discussed above in connection with FIGS. 3-5B.

For general-purpose use of this software-managed fast memory, the present invention provides ways to combine the results of the 8 or 16 pieces of data read from the 8 tables: XOR the results together, OR them together, select the entry from one of the 8 tables, or concatenate the 4-byte results into 8-byte or 16-byte results. This can be achieved by a tree of multiplexor blocks, as shown and described above in connection with FIG. 4. Detailed decoding of the controls for this block, from the sub-opcode fields defined below, are given in Table 9, below. The parallel read instruction is denoted in Table 10 by the term "Pread." At each level of MUXes, only two control signals, (C0, C1), are needed. Note that the first level of MUXes is the only level affected by the masking as in Pread.m. The MUX64 and MUX128 concatenate multiple 32-bit results. The last MUX level can be used to XOR the second operand, Rs2, for the Pread instruction.

TABLE 9

|  |  | (C0, C1) Value | | | |
|---|---|---|---|---|---|
|  |  | (0, 0) | (0, 1) | (1, 0) | (1, 1) |
| AMUX | Pread.* | L | L XOR R | L OR R | R |
|  | Pread.m.* | L & M1 | (L & M1) XOR (R & M0) | (L & M1) OR (R & M0) | R & M1 |
| BMUX |  | L | L XOR R | L OR R | R |
| MUX64 |  | L ∥ R | 0 ∥ L XOR R | 0 ∥ L OR R | 0 ∥ R |
| MUX128 |  | L ∥ R | 0 ∥ L XOR R | 0 ∥ L OR R | 0 ∥ R |
| MUX |  | L | L XOR R | L OR R | R |

Table 10, below, shows an example of AES encryption rounds carried out utilizing the Pcons functional unit of the present invention. Ten rounds of AES in 22 cycles are shown. R1 contains 128-bit plaintext. R2 and R3 contain the byte indices of permutation for the first 9 rounds and the tenth round, respectively. R4 is used for the tenth round to mask the lookup results. R10-R20 contain the round keys.

TABLE 10

| xor | R1, R1, R10 | # prologue XOR subkey |
|---|---|---|
| byteperm | R1, R1, R2 | # Config. reg. R2 contains byte indices |
|  |  | # (15,10,5,0,11,6,1,12,7,2,13,8,3,14,9,4) |
| Pread.x, b0 | R1, R1, R11 | # b0 denotes the first bank (encryption) |
| byteperm | R1, R1, R2 |  |
| Pread.x, b0 | R1, R1, R12 | # op-x denotes XOR in Combinatorial Logic MUX blocks |
| byteperm | R1, R1, R2 |  |
| Pread.x, b0 | R1, R1, R13 |  |
| byteperm | R1, R1, R2 |  |
| Pread.x, b0 | R1, R1, R14 |  |
| byteperm | R1, R1, R2 |  |
| Pread.x, b0 | R1, R1, R15 |  |
| byteperm | R1, R1, R2 |  |
| Pread.x, b0 | R1, R1, R16 |  |
| byteperm | R1, R1, R2 |  |
| Pread.x, b0 | R1, R1, R17 |  |
| byteperm | R1, R1, R2 |  |
| Pread.x, b0 | R1, R1, R18 |  |
| byteperm | R1, R1, R2 |  |
| Pread.x, b0 | R1, R1, R19 |  |
| byteperm | R1, R1, R3 | # Config. reg. R3 contains byte indices |
|  |  | # (5,0,15,10,1,12,11,6,13,8,7,2,9,4,3,14) |
| Pread.m.x, b0 | R1, R1, R4 | # R4 contains masking bytes: |
|  |  | # 0x 0000 0000 0000 0000 2184 2184 2184 2184 |
| xor | R1, R1, R20 |  |

The present invention was simulated using the CACTI 5.3 program to estimate the on-chip storage overhead of the present invention and to compare it with the on-chip level 1 cache of the same capacity. When compared to a cache with the same capacity (16 KB) with 2-way set-associativity, the access time of the present invention is on average 191% faster and the area is on average 55% smaller. Table 11, below, shows the CACTI simulation results for Pcons unit of the present invention using different bank configuration, and for on-chip caches of different capacity and associativity. Comparison of access time and physical chip area to complete a round for AES-128 for the first 9 rounds and the tenth round (assuming the tables are pre-loaded) are shown. The area does not include the combinational logic for the Pcons unit. All caches have 64-byte line size. As can be seen, the access time of the present invention is considerably smaller due to its small number of entries (256) and small line size (4 bytes). The area of a Pcons unit is smaller than the equivalent-sized cache, except for the direct-mapped 32 Kbyte cache, where a 4-bank Pcons unit is 10% larger.

TABLE 11

|  | 8 KB | | | 16 KB | | | 32 KB | | |
|---|---|---|---|---|---|---|---|---|---|
|  | Pcons 1 bank | DM cache | 2-way cache | Pcons 2 bank | DM cache | 2-way cache | Pcons 4 bank | DM cache | 2-way cache |
| Access time (ns) | 0.47 | 0.57 | 0.93 | 0.49 | 0.67 | 0.95 | 0.53 | 0.82 | 1.00 |
| Area (mm$^2$) | 0.22 | 0.45 | 0.82 | 0.24 | 0.50 | 0.84 | 0.67 | 0.61 | 0.89 |

The present invention permits key expansion for AES-128. The key expansion includes a series of operations on the 32-bit word level. Focus is made on the transformations done on a round key word, including a simple xor and a more complex transformation requiring table lookups and byte rotations. The following transformation is used in key expansion:

$$\text{temp} = \text{Sbox}(\text{RotWord}(\text{temp})) \text{ xor } \text{Rcon}[i/4] \quad \text{Equation 1}$$

As used above, RotWord rotates the input word leftward with 1 byte and the Sbox substitution is individually applied to each of the four bytes of the result of RotWord. Rcon[k] contains the value given by $[x^{i-1}, 0, 0, 0]$ with $x^{i-1}$ being the power of x in GF (256) and i is the iteration number. Without losing the general applicability of the present invention by adding an AES-only key generation module, it is assumed that one key is usually used to encrypt multiple plaintext blocks. Therefore, the key expansion algorithm can be performed and the round keys stored in the appropriate registers before the main encryption loop, e.g. R10-R20 in Table 10 above. The present invention can be utilized in the key expansion algorithm to speed up the process. It can be used for Sbox table lookups, and it is possible to store the Rcon values as a lookup table in the separate bank of Pcons and look up the Rcon values as well. The byte permutation instruction of the present invention can be used to facilitate the RotWord operation.

Table 12, below, summarizes the parallel read instructions capable of being executed by the parallel read functional unit of the present invention. Instruction mnemonics and a description of each instruction are provided:

TABLE 12

| Instruction | Mnemonic | Description |
|---|---|---|
| Pread.x.b | xor | xor the table lookup results |
| Pread.o.b | Or | or the table lookup results |
| Pread.s.n.b | select | select among table lookup results. n denotes the selected table. |
| Pread.m.x.b | mask, xor | mask and xor the table lookup results |
| Pread.m.o.b | mask, or | mask and or the table lookup results |

TABLE 12-continued

| Instruction | Mnemonic | Description |
|---|---|---|
| Pread.m.s.n.b | mask, select | mask and select among table lookup results. n denotes the selected table. |

Figure 9:
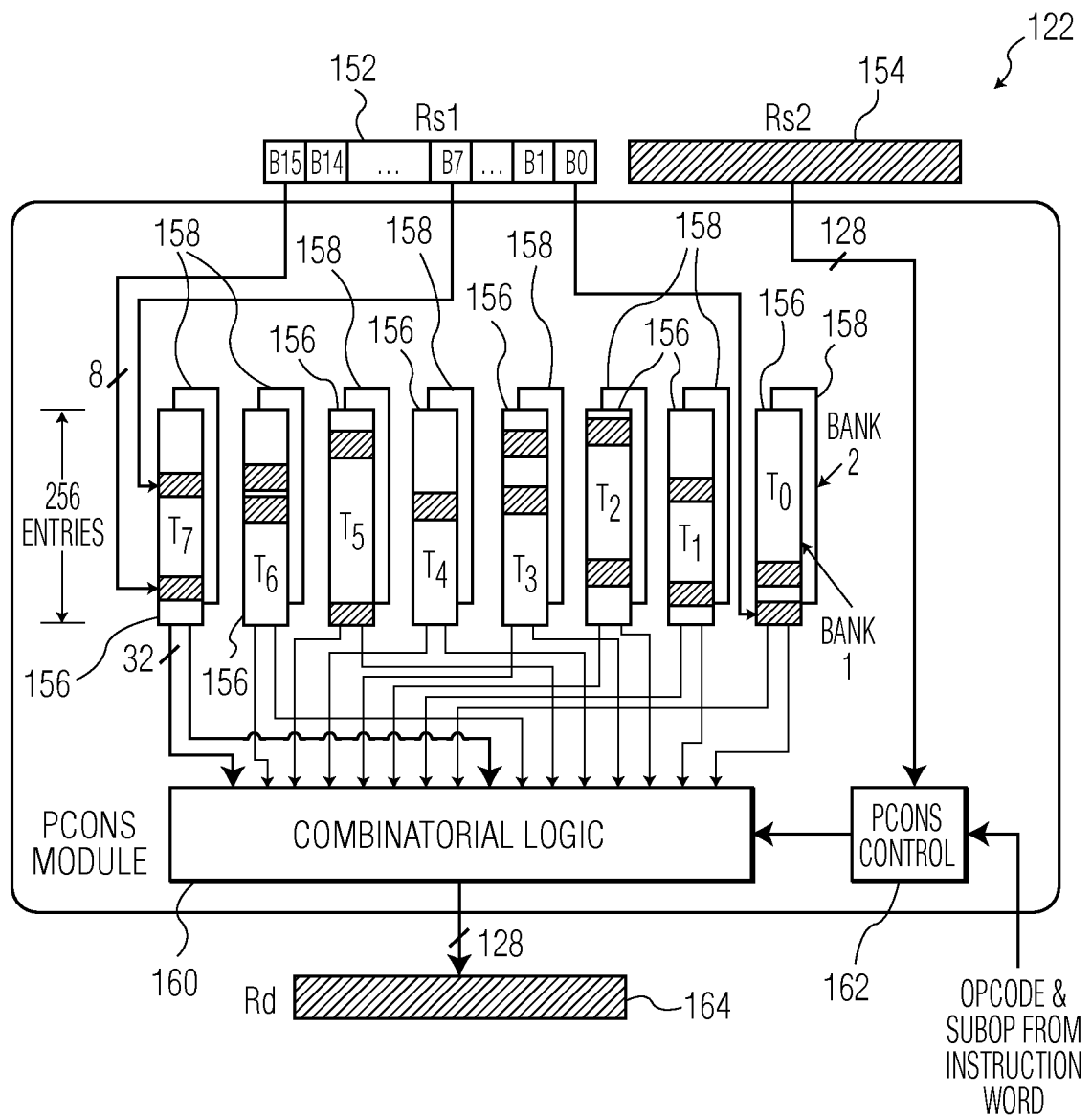
FIGS. 9-10 are diagrams showing the functional unit of the present invention extended to include two banks of parallel lookup tables.

The present invention can be extended to include two banks of tables, as shown in FIG. 9. In such circumstances, the parallel read functional unit 122 includes a first bank 156 of eight separate tables (T0-T7), and a second bank 158 of eight separate tables. Each table includes two read ports for reading information from each table in parallel. The control unit 162 decodes an operation code from an instruction word received by the functional unit 122 (for example, the instructions shown in Table 12 above), and controls the combinatorial logic circuit 160. The unit 122 operates on input registers Rs1 and Rs2 (labeled by numerals 152 and 154), and produces an output register Rd (labeled by numeral 164. Since each table is provide with two separate ports, one 128-bit register can address (and read) 16 pieces of data out of 8 separate tables in a single cycle. It is noted that modern microprocessors have 64-bit registers in their basic integer datapaths, and 128-bit registers in their multimedia datapaths. Hence, the parallel read instruction of the present invention can be implemented using the 128-bit multimedia registers, i.e., with the SSE instructions in Intel x86 processors or the Altivec instructions in the IBM Power processors. The first read ports of the 8 tables are addressed by the rightmost 8 bytes of Rs1, while the second read-ports of the 8 tables are addressed by the next (leftmost) 8 bytes.

The storage required for 8 tables, with 256 entries/table and 4 bytes/entry is 8 Kbytes. It is also possible to consider multiple banks of such tables, with each bank taking another 8 Kbytes. Note that a typical Level-1 cache is about 64 Kbytes. Hence, 2 banks (16 Kbytes) is only one-quarter of this size. Each parallel read instruction accesses one bank of 8 tables. The width of each table entry is ideally determined by the algorithm with which the unit 122 is operated. Typically, the ideal size ranges from 1 byte per entry to a max of 16 bytes for the 128-bit registers in multimedia units, e.g., SSE instructions in Intel processors or Altivec instructions in the Power processors. It is assumed that the hardware implements a size of 4 bytes per entry. Hence, in each parallel read instruction, up to 16 different 4-byte entries can be accessed, from 8 parallel tables. Since it is desirable for the unit 122 to unit to look more like a functional unit than memory, the processor's multimedia datapaths are connected to and from functional units. This implies that each instruction has two register operands (three for Altivec) and one register result, each register being 128 bits. Since the parallel read instruction reads 16 pieces of data each 4 bytes long, the 64 bytes of data are condensed into a register width of 128 bits (16 bytes). This is done by the combinational logic circuit 160 of FIG. 9.

Figure 10:
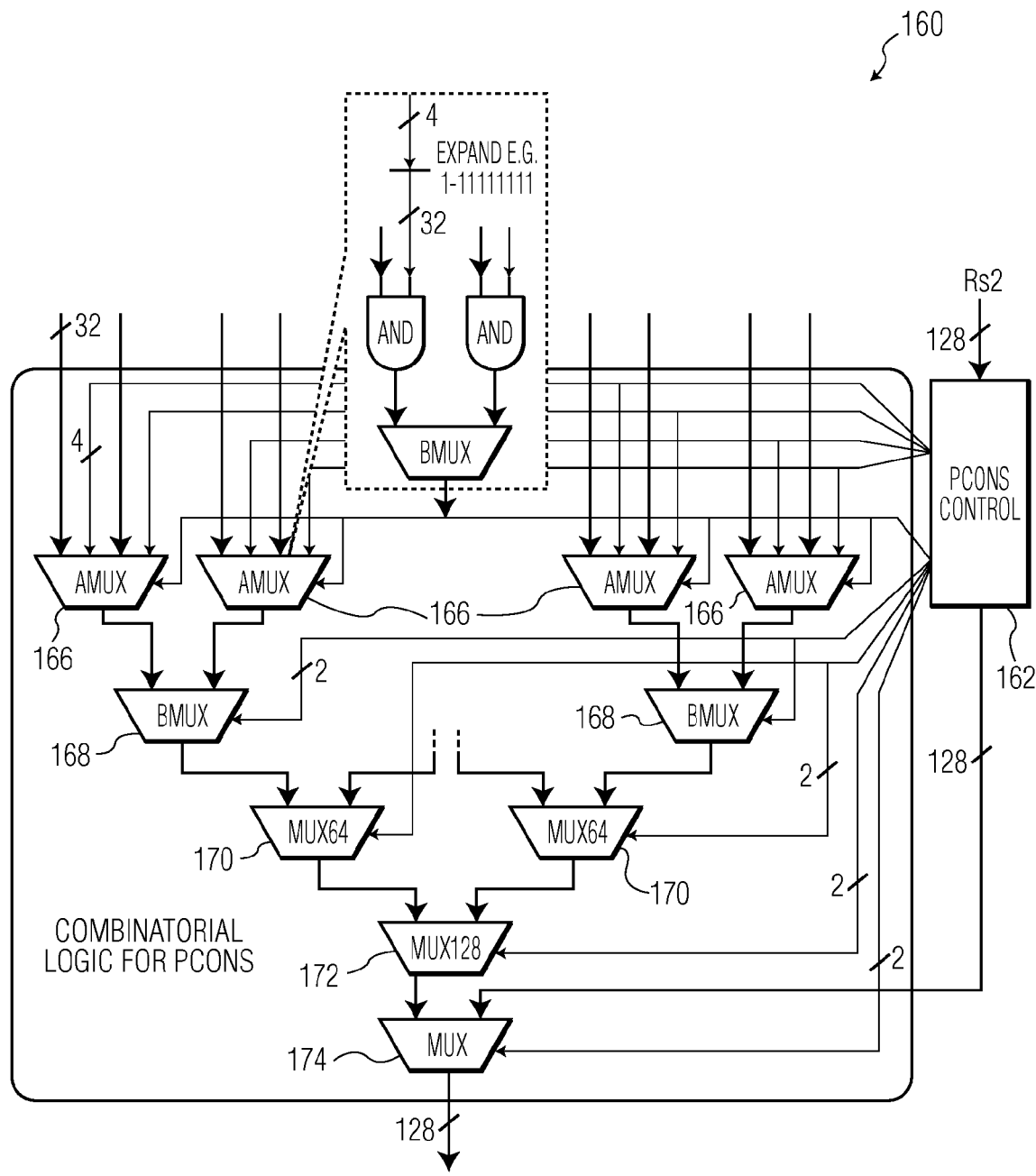

For general-purpose use of this software-managed fast memory, the present invention provides ways to combine the results of the 8 or 16 pieces of data read from the 8 tables: xor the results together, or them together, select the entry from one of the 8 tables, or concatenate the 4-byte results into 8-byte or 16-byte results. This can be achieved by the tree of multiplexor blocks 166-174 shown in FIG. 10, which shows the combinational logic circuit 160 in greater detail. The decoding of controls from this block are described in Table 9, above.

The parallel read function of the present invention can be expressed as follows, with several variants specified by the sub-opcode encodings:

Pread.m.op.b Rs1,Rs2,Rd when m is specified as in Pread.m, the 8 or 16 table outputs are first masked by bits from the second operand, Rs2. If m is not specified, as in a typical Pread instruction, Rs2 is XORed with the result at the last stage of the MUX-tree. In Pread.m, each bit of Rs2 is expanded into 8 bits, to mask a byte of the 4-byte output of a table. Hence, 4 mask bits are sufficient for a 4-byte table output, and a total of only 4*16=64 bits are needed for 16 table outputs. Hence, this can easily be accommodated by a 64-bit or 128-bit input register Rs2. While Pread.m provides a general-purpose masking of table outputs, it is this function that allows the last round of AES encryption to be done as efficiently as the other 9 rounds, thereby significantly speeding up execution time for AES encryption.

The op field (5 bits) has 3+16 encodings: XOR, OR, Concatenate, or Select one of 16 outputs read from the 8 tables. The b fieeld (2 bits) allows up to 4 banks of 8 tables each. Total encoding of these 3 sub-opcode fields can be done in only 8 bits. Note that for AES, each of the xMUX blocks in FIG. 10 reduces to a simple XOR operation. However, the present invention provides a more general-purpose implementation of the xMUX blocks, which only incurs a small amount of additional hardware overhead in access time and area, and is useful for many other algorithms.

Depending on the rest of the processor design, a Pread instruction can take either 1 or 2 processor cycles, but this will be a constant for all Pread instructions, hence thwarting any side-channel attacks. For table lookups using a typical hardware-managed cache, a cache hit takes 2 cycles but a cache miss can take 10-300 cycles. (A miss in the Level-1 cache but a hit in the Level-2 cache will result in a 10-20 cycle miss penalty, but a miss in the Level-2 cache as well would result in a 200-300 cycle miss penalty for retrieving the data from main memory.) This difference in cache hit and miss timing results in the cache-based side-channel attacks that can recover the AES key.

The tables of the present invention can be loaded at system initialization time to avoid swapping in and out for context switches. The time taken to write the tables does not degrade cipher performance since writing tables is not needed during encryption or decryption for AES. However, fast parallel writes may be desired for rapid initialization of tables at setup time. For this, a parallel initialize instruction, Pinit, can read an entire cache line from memory and write it to a common row of all eight tables of one bank in parallel. Therefore, only 256 of these Pinit instructions are needed to initialize one bank of the tables. Further, double-buffering can be used to initialize one bank of the tables while using the other bank for table lookups.

Since the encryption and decryption tables for AES do not change with the running processes, it is not necessary to save and restore the values of the tables during context switches; therefore, the tables only need to be loaded at system initialization time if only used for AES encryption and decryption.

In the Pread instruction, the position of the index byte in Rs1 selects the table that is read. For example, the rightmost byte of Rs1 reads an entry from T0, the next byte reads an entry from T1, and so on. This reduces the number of bits required to encode the instruction. Also, Pread can perform a much wider variety of table lookups by defining a byte permutation instruction that can perform any permutation of the bytes in a source register:

byteperm Rd, Rs, Rc

Here, Rs supplies the w=8 bytes to be permuted and Rc contains the bits that specify the permutation, where w is the word size, in bits. FIG. 6A, discussed above, shows an example of the instruction for w=64 bits. The bytes in Rs are indexed from 0 to 7, the rightmost being byte 0. The 32 right-aligned bits in Rc specify the order in which the source bytes are written to Rd; the rightmost nibble in Rc selects the source byte to be written to the rightmost byte of Rd, and so on. The leftmost 32 bits of Rc are unused.

Using the functional unit of the present invention, an AES-128 block encryption can be done in just 22 cycles in software, achieving the performance of 1.38 cycles/byte. Table 10, above, shows that each round for the first 9 rounds, takes just 2 instructions (cycles) each, using byteperm followed by a Pread. Note that the XOR of the round key is also done by the Pread instruction, using the second operand, Rs2, to supply the round key. This is done by the last MUX block in FIG. 10. The last round takes 3 instructions: byteperm, Pread.m and XOR. In comparison, without the Pread.m instruction, the last round of AES-128 will need at least 13 instructions. The present invention utilizes the same table transform for AES-128 decryption; thus the same 22 cycles is achieved for decryption as well, except that the table values are different from the values used for encryption. Therefore, for simultaneous encryption and decryption without the overhead of re-loading table values, the present invention takes advantage of the bank design of the tables: one bank of the tables is pre-loaded with the table values for encryption and the other for decryption. Note that, although in principle, a set of different tables for decryption should suffice, due to the non-unity values being multiplied in inverse MixColumn (InvMixColumn) step, the same masking technique used in the tenth round of encryption cannot be employed in the tenth round of decryption. In other words, masking of table lookup results is insufficient to generate the result for the tenth round of decryption, which bypasses the InvMixColumn step. In order to resolve this issue without modifying the general structure of the functional unit of the present invention, a special third bank is utilized which is loaded with the inverse sbox table values, taking up 256×1 byte X 8=2 KB more on-chip area overhead. With this method, it is not necessary to rearrange the byte indices in a different manner for the tenth round of decryption as is done in encryption. Note also that in counter-mode AES, no decryption is necessary, since only the counter has to be encrypted for both encryption and decryption. Hence, the extra banks for storing AES decryption tables are only required if other modes of AES are used.

Having thus described the invention in detail, it is to be understood that the foregoing description is not intended to limit the spirit or scope thereof. What is desired to be protected is set forth in the following claims.

What is claimed is:

1. A functional unit comprising:
   a first source register for receiving a first data item to be processed by the functional unit;
   a plurality of memory tables connected to the first source register, each of the plurality of memory tables indexed by different bits of a first index comprising a first portion of the first data item received by the first source register, and by different bits of a second index comprising a second portion of the first data item received by the first source register;
   a combinatorial logic circuit in communication with the plurality of memory tables, the combinatorial logic circuit receiving lookup results from the plurality of memory tables and processing the lookup results to produce a result data item; and
   a decoder circuit in communication with the combinational logic circuit, the decoder circuit extracting an operational code from an instruction supplied to the functional unit, decoding the operational code, and controlling the combinational logic circuit in accordance with the operational code.

2. The functional unit of claim 1, wherein the operational code comprises a sub-opcode for selecting operations performed by the combinatorial logic circuit.

3. The functional unit of claim 1, wherein the plurality of tables stored in memory can be indexed by more than one set of indices from the first register.

4. The functional unit of claim 1, wherein each memory table can be indexed by more than one index simultaneously.

5. The functional unit of claim 1, wherein a second register can be input to the combinatorial logic circuit, the second register receiving a second data item to be processed by the functional unit.

6. The functional unit of claim 5, wherein contents of the second register can be combined with the table lookup results.

7. The functional unit of claim 5, wherein the contents of the second register can be processed as a key in a cryptographic algorithm by the functional unit.

8. The functional unit of claim 5, wherein the contents of the second register can be combined as a mask.

9. The functional unit of claim 1, wherein the instruction comprises a parallel read instruction that causes the functional unit to mask the lookup results.

10. The functional unit of claim 5, further comprising a parallel read instruction that causes at least one bit of the second data item to mask at least one bit of the lookup results.

11. The functional unit of claim 10, wherein the parallel read instruction causes at least one bit of the second data item to be used as an input to the combinatorial logic circuit of the functional unit.

12. The functional unit of claim 5, wherein the functional unit expands at least one bit into a plurality of mask bits for masking a plurality of bits of at least one of the lookup results.

13. The functional unit of claim 5, wherein the instruction comprises a byte permutation instruction which causes the functional read unit to permute a plurality of bytes of at least one of the first or second data items.

14. The functional unit of claim 13, wherein an operational or sub-opcode causes the functional unit to perform a byte permutation operation which permutes a plurality of bytes of at least one of the first or second data items.

15. The functional unit of claim 13, wherein an operational or sub-opcode together with the second data item, causes the functional unit to perform a byte permutation operation which permutes a plurality of bytes of the first data item.

16. The functional unit of claim 1, wherein the functional unit processes data from a plurality of different memory banks, as indicated by an operation code or sub-opcode.

17. The functional unit of claim 16, wherein one bank of the plurality of memory banks can be used for AES encryption, and a second bank of the plurality of memory banks can be used for AES decryption.

18. The functional unit of claim 17, wherein a third bank of the plurality of memory banks can be used for encryption and/or decryption for a different cipher.

19. The functional unit of claim 1, wherein the functional unit executes a write instruction for writing data to at least one of the plurality of tables.

20. The functional unit of claim 1, wherein at least one of the plurality of tables is loaded with data at system initialization.

21. A functional unit for a microprocessor, comprising:
   first and second source registers for receiving first and second data items to be processed by the functional unit;

a plurality of memory tables connected in parallel to the first source register, each of the plurality of memory tables including a plurality of input ports and indexed by a first index comprising a first portion of the first data item received by the first source register and a second index comprising a second portion of the first source register, the indexes pointing to a plurality of lookup results in the plurality of memory tables;

a combinatorial logic circuit in communication with the plurality of memory tables and the second source register, the combinatorial logic circuit receiving the plurality of lookup results and processing the lookup results and the second data item in the second source register to produce a result data item the combinational logic circuit masking at least a portion of the lookup results; and a decoder circuit in communication with the combinatorial logic circuit, the decoder circuit extracting an operational code from an instruction supplied to the functional unit, decoding the operational code, and controlling the combinatorial logic circuit in accordance with the operational code.

22. The functional read unit of claim 21, wherein the instruction comprises a parallel read instruction that causes the functional unit to mask at least one bit of at least one of the plurality of lookup results.

23. The functional read unit of claim 22, wherein the parallel read instruction causes at least one bit of the second data item to mask at least one bit of the first data item.

24. The functional read unit of claim 22, wherein the parallel read instruction causes at least one bit of the second data item to be used as an input to the combinatorial logic circuit of the functional unit.

25. The functional read unit of claim 22 wherein the functional unit expands at least one bit into a plurality of mask bits for masking a plurality of bits of at least one of the plurality of lookup results.

26. The functional read unit of claim 21, wherein the instruction comprises a byte permutation instruction which causes the functional read unit to permute a plurality of bytes of at least one of the first or second data items.

* * * * *

UNITED STATES PATENT AND TRADEMARK OFFICE
CERTIFICATE OF CORRECTION

| | | |
|---|---|---|
| PATENT NO. | : 8,943,297 B2 | Page 1 of 2 |
| APPLICATION NO. | : 13/736379 | |
| DATED | : January 27, 2015 | |
| INVENTOR(S) | : Lee et al. | |

It is certified that error appears in the above-identified patent and that said Letters Patent is hereby corrected as shown below:

In the drawings,

The drawing sheet, consisting of Fig. 6A, should be deleted to be replaced with the drawing sheet, consisting of Figs. 6A-6B, as shown on the attached page.

In the specification,

In Column 6, line 32, the first letter of the term "Perm" should be a lowercase "p"; and In Column 14, line 17, the word "fieeld" should be deleted and replaced with the word "field.".

Signed and Sealed this
First Day of March, 2016

Michelle K. Lee
*Director of the United States Patent and Trademark Office*